United States Patent
Kalhan

(10) Patent No.: US 9,930,642 B2
(45) Date of Patent: Mar. 27, 2018

(54) MANAGEMENT OF DEVICE-TO-DEVICE COMMUNICATION RESOURCES USING CHANNEL SYMMETRY

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 118 days.

(21) Appl. No.: 14/400,376

(22) PCT Filed: May 23, 2013

(86) PCT No.: PCT/US2013/042503
§ 371 (c)(1),
(2) Date: Nov. 11, 2014

(87) PCT Pub. No.: WO2013/177447
PCT Pub. Date: Nov. 28, 2013

(65) Prior Publication Data
US 2015/0146633 A1  May 28, 2015

Related U.S. Application Data

(60) Provisional application No. 61/650,865, filed on May 23, 2012.

(51) Int. Cl.
*H04W 72/04* (2009.01)
*H04L 1/16* (2006.01)
(Continued)

(52) U.S. Cl.
CPC ...... *H04W 72/0406* (2013.01); *H04B 7/0413* (2013.01); *H04L 1/1607* (2013.01);
(Continued)

(58) Field of Classification Search
CPC ............ H04W 72/0406; H04W 72/06; H04W 72/085; H04W 76/023; H04W 4/005; H04B 7/0413; H04L 1/1607; H04L 5/0055
See application file for complete search history.

(56) References Cited

U.S. PATENT DOCUMENTS 7,808,905 B2 * 10/2010 Ibaraki ................ H04L 12/6418
370/235
8,169,957 B2   5/2012 Damnjanovic
(Continued)

FOREIGN PATENT DOCUMENTS

EP       1 998 499        12/2008
WO    2010013961 A2     2/2010
(Continued)

OTHER PUBLICATIONS

Texas Instruments; "Comparison of Different ACK/NAK in CQI RS Transmission Schemes"; 3GPP Draft: R1-080189; Jan. 9, 2008; 3GPP Mobile Competence Centre, France.
(Continued)

*Primary Examiner* — Asad Nawaz
*Assistant Examiner* — Thomas R Cairns

(57) ABSTRACT

A first wireless communication device measures a signal characteristic of a reference signal transmitted by a second wireless communication device. The first wireless communication device transmits information to a base station where the information is based of the measured signal characteristic. A scheduler evaluates the information to identify device to device (D2D) communication resources. The base station transmits, to the first wireless communication device, D2D resource allocation information indicating the D2D communication resources. The first wireless communication device transmits a D2D signal to the second wireless com-
(Continued)

munication device using the assigned D2D communication resources.

17 Claims, 5 Drawing Sheets

(51) Int. Cl.
*H04W 76/02* (2009.01)
*H04L 5/00* (2006.01)
*H04W 4/00* (2018.01)
*H04W 72/06* (2009.01)
*H04B 7/0413* (2017.01)
*H04W 72/08* (2009.01)

(52) U.S. Cl.
CPC ........... *H04L 5/0055* (2013.01); *H04W 4/005* (2013.01); *H04W 72/06* (2013.01); *H04W 76/023* (2013.01); *H04W 72/085* (2013.01)

(56) References Cited

U.S. PATENT DOCUMENTS

| | | | |
|---|---|---|---|
| 8,170,081 B2 * | 5/2012 | Forenza | H04B 7/0417 370/278 |
| 8,478,262 B2 * | 7/2013 | Sun | H04W 36/0088 455/423 |
| 8,493,887 B2 * | 7/2013 | Palanki | H04W 76/023 370/254 |
| 8,504,052 B2 | 8/2013 | Hakola et al. | |
| 8,625,567 B2 * | 1/2014 | Sim | H04W 16/14 370/341 |
| 8,942,192 B2 | 1/2015 | Damnjanovic et al. | |
| 9,084,241 B2 | 7/2015 | Madan et al. | |
| 9,143,275 B2 | 9/2015 | Li et al. | |
| 9,398,614 B2 * | 7/2016 | Kubota | G08C 19/32 |
| 9,516,686 B2 * | 12/2016 | Barbieri | H04W 76/023 |
| 2009/0022098 A1 * | 1/2009 | Novak | H04L 1/14 370/329 |
| 2009/0042558 A1 | 2/2009 | Shen et al. | |
| 2009/0110038 A1 | 4/2009 | Montojo et al. | |
| 2010/0165882 A1 | 7/2010 | Palanki et al. | |
| 2012/0093098 A1 | 4/2012 | Charbit et al. | |
| 2012/0106517 A1 | 5/2012 | Charbit et al. | |
| 2014/0056213 A1 * | 2/2014 | Goto | H04W 16/26 370/315 |
| 2014/0057670 A1 | 2/2014 | Lim et al. | |
| 2014/0094183 A1 | 4/2014 | Gao et al. | |

FOREIGN PATENT DOCUMENTS

| | | |
|---|---|---|
| WO | 2010082114 A1 | 7/2010 |
| WO | WO 2011-109941 | 9/2011 |
| WO | WO 2011-132908 | 10/2011 |
| WO | 2011156638 A2 | 12/2011 |

OTHER PUBLICATIONS

TD Tech; "Some Considerations on Bundled and Multiplexing ACK Transmission in TDD"; 3GPP Draft: R1-081940; May 2008; 3GPP Mobile Competence Centre, France.

* cited by examiner

MANAGEMENT OF DEVICE-TO-DEVICE COMMUNICATION RESOURCES USING CHANNEL SYMMETRY

RELATED APPLICATIONS

The present application is related to PCT Application No. PCT/US2013/042511, entitled "ACKNOWLEDGMENT MESSAGING OVER REFERENCE SIGNALS," and PCT Application No. PCT/US2013/042505, entitled "TRANSMISSION OF DEVICE-TO-DEVICE (D2D) CONTROL DATA FROM A FIRST D2D DEVICE TO A SECOND D2D DEVICE IN A CELLULAR COMMUNICATION SYSTEM," both filed concurrently on May 23, 2013 with this application, assigned to the assignee hereof and hereby expressly incorporated by reference in its entirety.

FIELD

This invention general by relates to wireless communications and more particularly to management of device-to-device (D2D) communication resources using D2D channel symmetry.

BACKGROUND

Many wireless communication systems use base stations to provide geographical service are where wireless communication use equipment (UE) devices communicate with the base station providing the particular geographical service area in which the wireless communication UE devices are located. The base stations are connected within a network allowing communication links to be made between the wireless communication devices and other devices. In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication.

SUMMARY

A first wireless communication device measures a signal characteristic of a reference signal transmitted by a second wireless communication device. The first wireless communication device transmits information to a base station where the information is based on the measured signal characteristic. A scheduler evaluates the information to identify device to device (D2D) communication resources. The base station transmits, to the first wireless communication device, D2D resource allocation information indicating the D2D communication resources. The first wireless communication device transmits a D2D signal to the second wireless communication device using the assigned D2D communication resources.

DETAILED DESCRIPTION

Figure 1A:
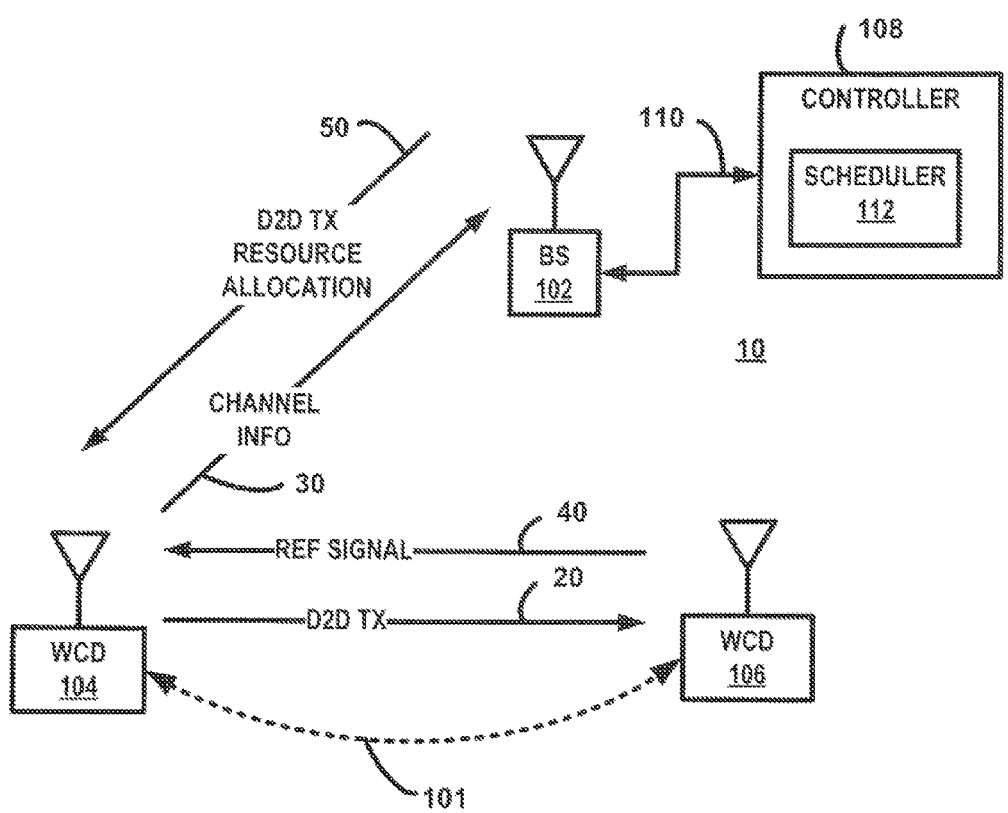
FIG. 1A is block diagram of an example of macrocell communication system that supports device to device (D2D) communication where D2D communication resources for a D2D transmission from a wireless communication device are assigned based on channel information derived from a reference signal received and measured at the wireless communication device.

FIG. 1A is block diagram of an example of macrocell communication system 10 that supports device to device (D2D) communication where D2D communication resources for a D2D transmission 20 from a wireless communication device are assigned based on channel information 30 derived from a reference signal 40 received and measured at the wireless communication device. D2D resource allocation information 50 is transmitted from a base station 102 and received by the wireless communication device 104 where the D2D resource allocation information 50 identifies the communication resources that should be used by the wireless communication device 104 for D2D transmission 20 to another wireless communication device 106. The first wireless communication device 104 measures the reference signal 40 transmitted from the second wireless communication device 106 to generate the channel information 30.

In the examples discussed herein, therefore, D2D communication resources for transmitting a D2D signal from a first wireless communication device 104 to a second wireless communication device 106 are scheduled based on channel conditions measured by the first wireless communication device 104. In some examples, the wireless communication devices periodically transmit reference signals for device detection/discovery, channel estimation, and timing acquisition. In one implementation, the second wireless communication device 106 periodically transmits D2D reference signals such as D2D Sounding Reference Signals (SRS) over communication resources assigned by the controller. The first wireless communication device receives the reference signal 40 transmitted from the second wireless communication device 106 and measures at least one signal characteristic to determine the channel conditions to report to the base station 102. Examples of signal characteristics that can be measured include Least Square (LS) estimation, interference and noise power measurement, signal power measurement and SINR calculation. The channel information may include directly measured parameters or may include information that is based on the measured parameters depending on the particular implementation. For the example discussed herein, the channel information includes Channel State Information (CSI) of the channel between the second wireless communication device 106 and the first wireless communication device 104. The CSI is determined using techniques similar to convention techniques for determining CSI of a channel between a mobile device and a base station. The scheduler 112 that is communicatively connected to the base station schedules (assigns) communication resources for transmitting D2D signals from the first wireless communication device to the second wireless communication device. The scheduler 112 uses the reported channel information to schedule the appropriate resources. Therefore, measured signal characteristics of reference signals transmitted from the second wireless communication device to the first wireless communication device are used to schedule D2D transmissions from the first wireless communication device to the second wireless communication device.

For the examples herein, the communication system utilizes macrocell communication resources for communication between base stations (eNodeBs, eNBs) and wireless communication user equipment devices (UEs). The macrocell communication resources include downlink communication resources for downlink communication from a base station to wireless communication user equipment (UE) devices and uplink communication resources for uplink transmissions from the UE devices to the base station. The uplink communication resources are different from the downlink communication resources. Some of the macrocell communication resources are assigned to device-to-device (D2D) communication between two UE devices as needed. The downlink communication resources assigned for D2D communication are not used for downlink communication. For example, if the communication resources are time-frequency communication resources, the time segments and frequency bands (e.g., sub-carriers) assigned to the D2D communication link are not used by the base station. If uplink communication resources are as for D2D communication, the resources are assigned such that interference to other D2D communication and to uplink communication in adjacent cells, as well is the same cell, is minimized. Examples of suitable techniques for managing macrocell resources for D2D communication are discussed in Patent Application Serial Number PCT/US2012/064711, entitled "DEVICE TO DEVICE COMMUNICATION MANAGEMENT USING MACROCELL COMMUNICATION RESOURCES," filed on Nov. 12, 2012, and incorporated by reference in its entirety herein.

Figure 1B:
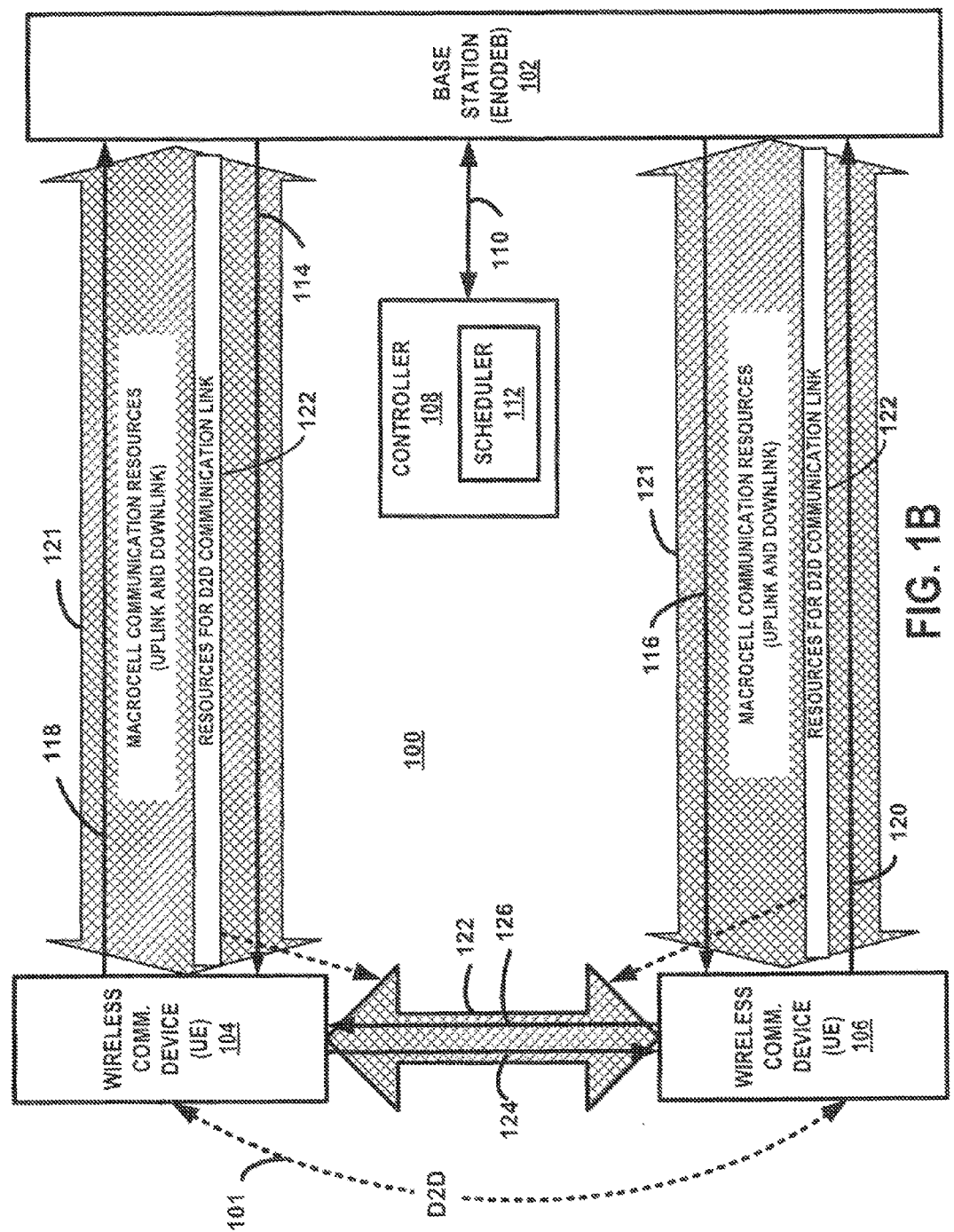
FIG. 1B is a block diagram of an example of a communication system where macrocell communication resources are used to establish a device-to-device (D2D) communication link between wireless communication devices.
Figure 1C:
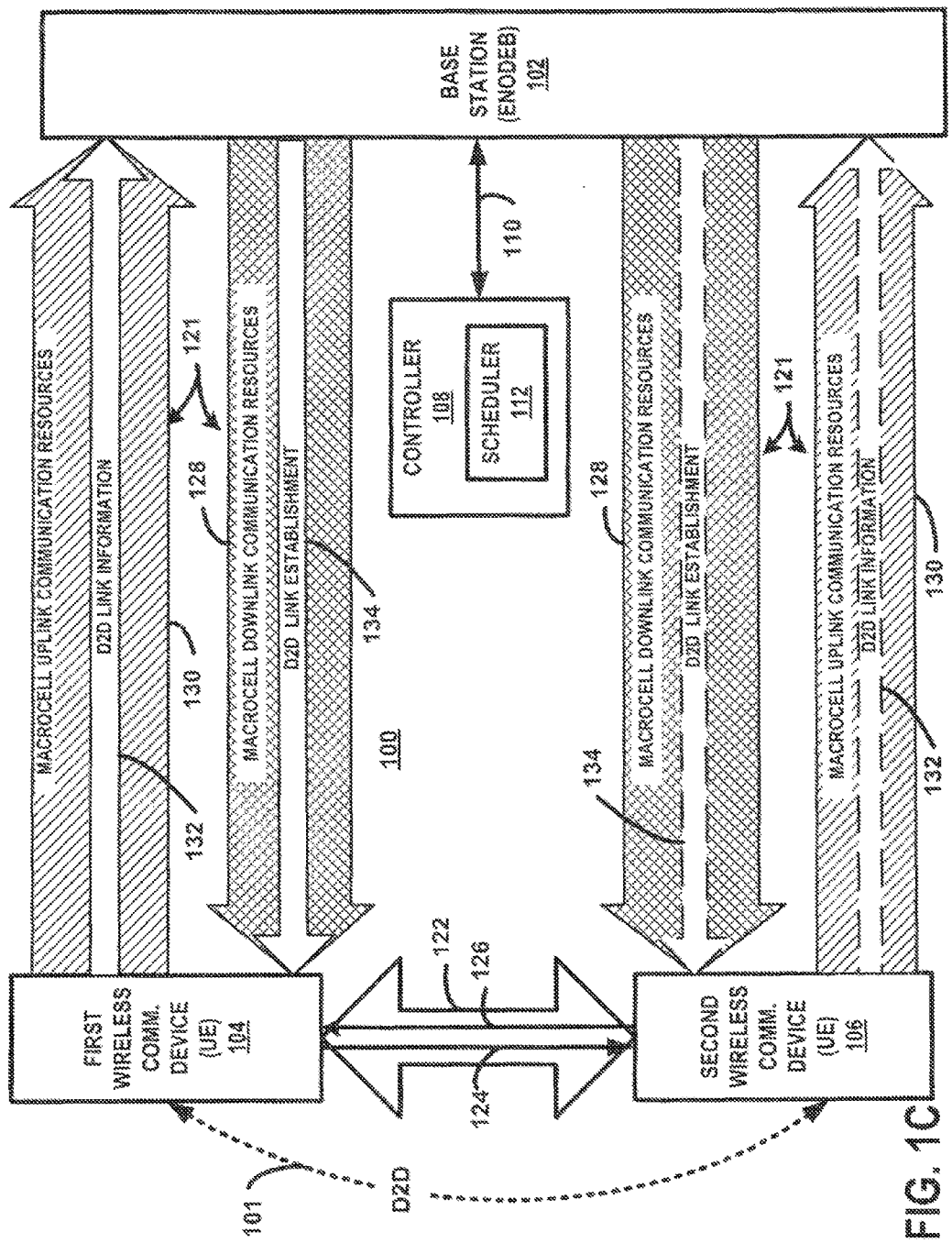
FIG. 1C is a block diagram of an example of the resources used in the communication system of FIG. 1A to establish the D2D communication link.

FIG. 1B and FIG. 1C are bock diagrams of an example of the communication system 10 where macrocell communication resources are used for communication with wireless communication devices to establish the device-to-device (D2D) communication link 101 between wireless communication devices. A relationship between macrocell communication resources and the D2D communication link is shown in FIG. 1B. In FIG. 1C, the resources for establishing the D2D communication link are shown. The base station 102 provides wireless communication services to wireless communication user equipment (UE) devices 104, 106 within a geographical service area, sometimes referred to as a cell. Several base stations are typically interconnected through a backhaul 110 to provide several service area to cover large areas. The various functions and operations of the blocks described with reference to the communication system 10 may be implemented in any number of devices, circuits, or elements. Two or more of the functional blocks may be integrated in a single device, and the functions described as performed in any single device may be implemented over several devices. For example, at least some of the functions of the controller 108 may be performed by the base stations 102 and vice versa. A cellular communication system is typically required to adhere to a communication standard or specification. The Third-Generation Partnership Project Long Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 102 is a fixed transceiver station, sometimes referred to as an eNodeB or eNB, which may include a controller in some circumstances. The base station 102 is connected to a controller 108 through a backhaul 110 which may include any combination of wired, optical, and/or wireless communication channels. For the examples herein, the controller 108 includes the functionality of the Mobility Management Entity (MME) and the Packet Gateway (P-GW) in a 3GPP LTE communication system. Accordingly, the controller 108 includes a scheduler 112. In the example, the scheduler 112 allocates time-frequency resources for D2D communication between the wireless communication devices 104, 106 and for macrocell communication between the base station 102 and the wireless communication devices 104, 106.

The wireless (UE) communication devices 104, 106 may be referred to as mobile devices, wireless devices, wireless communication devices, and mobile wireless devices, UEs, UE devices as well as by other terms. The wireless communication UE devices 104, 106 include electronics and code for communicating with base stations and with other wireless communication devices D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 104. For example, a wireless communication device may include a wireless modem connected to an appliance, computer, or television.

The base station 102 includes a wireless transceiver that exchanges wireless signals 114, 116, 118, 120 with the wireless communication devices 104, 106. Transmissions from the base stations and from the wireless communication devices 104, 106 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device.

The macrocell communication resources 121 are used for transmitting the downlink signals 114, 116 and the uplink signals 118, 120. The base station 102 transmits downlink signals 114, 116 to the wireless communication devices 104, 106 using scheduled downlink communication resources of the defined downlink communication resources defined by the communication specification and reserved for downlink communication. The wireless communication devices transmit uplink signals 118, 120 to the base station using scheduled uplink communication resources of the defined uplink communication resources defined by the communization specification and reserved for uplink communication. The macrocell communication resources 121 include frequency bands divided in time where each frequency band and segment of time can be identified by the scheduler 112 and described in control signals sent from the base station 102 to the wireless communication devices 104, 106. The communication specifications, or other system rules, therefore, define applicable communication resources for the downlink and applicable communication resources for the uplink. The scheduler 112 allocates different time-frequency resources to different devices to efficiently utilize the resources while minimizing interference. Accordingly, the scheduled macrocell communication resources used for signals 114, 118 exchanged with one wireless communication device 104 are different from scheduled macrocell communication resources used for other signals 116, 120 exchanged with other wireless communication devices 106. As referred to herein, therefore, the macrocell communication resources 121 are the communication resources reserved for communication by the specification and/or communication system rules. The scheduled resources for transmission for particular signals, however, are a subset of the reserved macrocell communication resources 121.

Some of the defined macrocell communication resources are assigned (scheduled) for D2D communication. This portion (122) of defined macrocell communication resources 121, referred to as D2D communication resources 122, is typically scheduled dynamically as needed and based on channel conditions as well as other criteria. The scheduler 112, therefore, may assign either defined macrocell downlink communication resources, defined macrocell uplink communication resources, or both for D2D communication.

In certain situations, it may be desirable for the wireless communication device to communicate directly over a D2D communication link instead of through base stations. During D2D communication, the first wireless communication device 104 transmits first D2D signals 124 to the second wireless communication device 106, and the second wireless communication device 106 transmits second D2D signals 126 to the first wireless communication device 104. In some situations, the D2D transmission may only be in one direction. For example, a D2D link may be established from a laptop to a display where only the laptop transmits signals to the display for broadcasting, streaming and other purposes. Some advantages of D2D communication include reduced interference within a cell and reduced battery consumption at the wireless communication devices. For example, when the D2D wireless communication devices are close to each other, the transmission power level can be significantly lower than would be necessary for transmission to the macrocell base station. As a result, the lower power signals cause less interference in the cell. The lower transmission power also results in less battery consumption.

For efficient D2D communications the wireless communication devices typically must be close to each other. Since many wireless communication devices are mobile, the distance between any two devices changes. As a result, either the network or one of the wireless communication devices must determine that the wireless communication devices are sufficiently close for D2D communication. In the examples herein, a wireless communication device detects another nearby wireless communication device by receiving a reference signal transmitted by the other wireless communication device. After detection, the wireless communication device may attempt to initiate a D2D communication link 113 as discussed in further detail below.

The scheduler 112 allocates time-frequency resources for communication between the base station 102 and the wireless communication devices 104, 106. In addition, the controller 108, scheduler 112, and/or the base station 102 schedules sounding reference signals (SRS) on the uplink. In the examples discussed herein, the scheduler 112 also allocates (schedules) time-frequency resources for transmission of D2D reference signals such as D2D SRS from the wireless communication UE devices 104, 106 to establish and/or maintain the device-to-device (D2D) communication link 113. The D2D SRS transmissions are used for device detection/discovery, signal acquisition (reception), channel estimation, and determining CSI. Examples of such techniques are described in PCT patent application serial number PCT/US2012/64712, filed on Nov. 12, 2012, and incorporated by reference in its entirety herein in the examples herein, therefore, wireless communication devices detect/discover other wireless communication devices in their vicinity by transmitting and receiving D2D SRS signals.

As discussed above, when one wireless communication device is aware of another wireless communication device and intends to communicate with the other wireless communication device, it may be more efficient to communicate through a D2D communication link instead of through the network. In order to avoid interference, the communication resources used for the D2D communication link 101 must be assigned or scheduled. Although it may be possible for the wireless communication devices to track and assign communication resources autonomously, a more centralized controller within the network can be more efficient at the cost of higher complexity, reducing processing at the wireless communication devices.

Referring now to FIG. 1C, the communication system 10 utilizes downlink communication resources 128 for downlink communication from a base station to wireless communication user equipment (UE) devices and utilizes uplink communication resources 130 for uplink transmissions from the UE devices to the base station. The uplink communication resources are different from the downlink communication resources. Depending on the particular implementation, some of the downlink communication resources 128, some of the uplink communication resources 130, or some of both are assigned for device-to-device (D2D) transmission from wireless communication (UE) devices as needed. Accordingly, the D2D signals 124, 126 may use downlink communication resources 128 or uplink communication resources 130 assigned by the scheduler 112. The communication resources 122 assigned for D2D communication are not used for downlink communication. For example, if the communication resources are time-frequency communication resources, the time segments and frequency bands assigned for D2D transmission are not used by the base station to serve non-D2D wireless communication (UE) devices, if uplink communication resources are assigned for D2D communication, the scheduling of those resources to other devices is managed to minimize interference and maximize throughput.

The wireless communication (UE) devices transmit the D2D signals 124, 126 using the assigned communication resources 122. As discussed herein, defined downlink communication resources are communication resources defined by a communication specification as the communication resources reserved for downlink communication from a base station to wireless communication devices. Scheduled downlink communication resources are a subset of the defined downlink communication resources that have been assigned (scheduled) for downlink communication between a base station and a wireless communication device, and D2D communication resources 122 are a subset of the defined downlink communication resources that have been assigned (scheduled) for D2D transmission from wireless communication devices if downlink communication resources are used for D2D communication.

Also as discussed herein, defined uplink communication resources are communication resources defined by a communication specification as the communication resources reserved for uplink communication from a wireless communication devices to base stations. Scheduled uplink communication resources are is subset of the defined uplink communication resources that have been assigned (scheduled) for uplink communication between a wireless communication device and a base station, and D2D communication resources 122 are a subset of the defined uplink communication resources that have been assigned (scheduled) for D2D transmission from wireless communication devices if uplink resources are used for D2D communication. Therefore, the defined macrocell communication resources 121 include defined macrocell downlink communication resources 128 and defined macrocell uplink communication resources 130 where a subset of one or both of the defined resources are assigned for D2D communication.

For the examples herein, the communication network manages D2D communication links by receiving and transmitting information over macrocell communication resources. Wireless communication devices transmit D2D link information 132 to base stations using macrocell uplink communication resources and base stations transmit D2D link establishment messages 134 to the wireless communication devices using macrocell downlink communication resources. Examples of techniques for establishing D2D calls are discussed in PCT Patent Application No. PCT/US2013/040584, entitled "MANAGEMENT OF DEVICE-TO-DEVICE COMMUNICATION RESOURCES USING MACROCELL COMMUNICATION RESOURCES", filed on May 10, 2013 and incorporated by reference in its entirety herein. As discussed in the referenced PCT Application No. PCT/US2013/040584, a D2D call/session can be initiated by a wireless communication device by sending a D2D call initiation message using macrocell uplink communication resources. The D2D call initiation message can further include a D2D call type indicator indicating whether the establishment of the D2D communication link is for a Voice over Internet Protocol (VoIP) call or for a transfer of data. If the D2D call type indicator indicates the transfer of data, the D2D call initiation message further includes a D2D Buffer Status Report (BSR) indicating a volume of data to be transmitted over the D2D communication link.

The first wireless communication device, in response to the base station, transmits D2D link information 132 to the base station. The D2D link information 132 may include any parameter or indicator that provides the base station information regarding the communication link between the first wireless communication device and the second wireless communication device. The D2D link information 132, at least includes the channel information 30, and may include parameters describing the channel quality, amount of data to be transmitted over the D2D link, transmission power and other information. For the examples herein, the D2D link information may include a D2D Buffer Status Report (BSR) indicating a volume of data to be transmitted over the D2D communication link, a D2D Power Headroom Report (PHR) indicating available transmission power for D2D transmission over the D2D communication link, and D2D Channel State Information (CSI) comprising at least one characteristic of a channel of the D2D communication link. For this example, therefore, the channel information 30 is the D2D CSI that is based on the measurements of the reference signal 40 made by the first wireless communication device 104.

The base station sends D2D link establishment information 134 to at least one of the wireless communication devices. The D2D link establishment information includes information that allows the wireless communication devices to communicate over the D2D communication link and includes scheduling information for time-frequency communication resources to be used for the D2D communication link. The D2D link establishment information may include specific information for a single one-way D2D transmission or may include more general channel information such as identification of authorized D2D resources that allow the wireless communication devices to schedule multiple D2D transmissions without specific instruction by the network for each transmission. For the example, the D2D link establishment information 134 sent to the first wireless communication device includes the D2D transmission resource allocation information 50 identifying the communication resources for D2D transmission 20 from the first wireless communication device to the second wireless communication device. The D2D link establishment information is transmitted to a wireless communication device using macrocell downlink communication resources. As discussed in the referenced PCT application No. PCT/US2013/040584, an example of a suitable technique for transmitting the D2D link establishment information 134 includes sending the information over a physical downlink control channel (PDCCH). Such a PDCCH is similar to a conventional PDCCH transmission assigning communication resources for macrocell communication except that the identified communication resources are assigned for D2D communication instead of conventional macrocell communication.

For the examples, therefore, scheduler 112 in the controller 108 allocates D2D time-frequency resources 122 to the wireless communication devices 104, 106 by providing the D2D link establishment information 134. The information 134 is transmitted by the base station using the PDCCH although the information may be transmitted using any number of control signals, and/or messages.

For the example of FIG. 1C, D2D link information 132 is transmitted only from one wireless communication device and D2D link establishment information is transmitted by the base station 102 to only to the first wireless communication device. Although the D2D link information 30 may be transmitted by both of the devices in some circumstances, sending the D2D link information 30 from only the first wireless communication device minimizes the use of communication resources. Sending the D2D link information 132 from only one device 104, therefore, results in more efficient use of communication resources since communication resources are not reserved for transmitting link information from the second wireless communication device 106. The scheduler 112 schedules resources for transmission from the first wireless communication device based on the assumption that D2D channel between the two devices 104, 106 is the same in both directions. In other words, there is channel reciprocity in the direction of transmission. Accordingly, the reported channel information 30 is used to schedule transmission in the opposite direction of the transmission of the reference signal used to determine the channel information. For the example, the link establishment information is transmitted by the base station to only one of devices to further reduce the use of communication resources for D2D management. The D2D link establishment information 134 includes the D2D resource allocation information 50 for the example.

In some situations, the reference signals may be transmitted and received by both wireless communication devices and both devices can report D2D link information. The base station can select which D2D link information to use for scheduling D2D resources and instruct one of the devices to stop reporting the D2D link information.

The selection by the base station of the device that is to stop reporting D2D link information can be based on several factors. In one situation, the selection is based on the direction of data traffic. For example, if the first wireless communication device is transmitting D2D traffic to the second wireless communication device, the base station may instruct the second wireless communication device to cease reporting D2D link information. If the second wireless communication device is transmitting D2D traffic back to first wireless communication device, the base station may instruct first wireless communication to cease sending D2D link information and instruct the second wireless communication device to resume transmission of D2D link information. As a result, each wireless communication device reports D2D link formation when its transmitter is already active for D2D transmissions. Due to channel reciprocity (channel conditions are the same in both directions), each wireless communication device does not need to report channel conditions in the D2D link information. On the other hand, to optimize transmissions, the device that is already transmitting D2D data can also transmit D2D link information to the base station. One technique includes time-domain multiplexing to transmit D2D data and D2D link information while the radio frequency (RF) circuits are active. After transmitting D2D data in a D2D allocated subframe, the wireless communication device can retune and/or power adjust its transmitter to send D2D link information to the base station in the next subframe or other subsequent subframe. Other techniques may include using multi-carrier transmissions where one carrier can be used for D2D and another carrier can be used for sending D2D link information to the base station. Code division can also be used in case where the base station is sufficiently close to the wireless communication devices. An example of communication after the base station has instructed the second wireless communication device to cease sending channel information is illustrated in FIG. 1.

For one example, the D2D establishment information identifies all transmission parameters for D2D communication resources and, therefore, includes the physical format parameters such as Multiple input Multiple Output (MIMO) parameters. Coding Rate parameters Power Control parameters, and Modulation Order parameters in addition to the time-frequency parameters. In another example, however, the scheduler only identifies the time-frequency parameters allowing the wireless communication devices to determine the MIMO, Coding Rate, Power Control, and Modulation Order parameters. The channel information sent to the controller in such an example includes only channel information required for the scheduler to assign the time-frequency resources. The first wireless communication device applies other measured channel characteristics, extrapolated information, and/or other channel information to determine appropriate MIMO, Coding, Rate, Power Control, and Modulation Order parameters.

Figure 2:
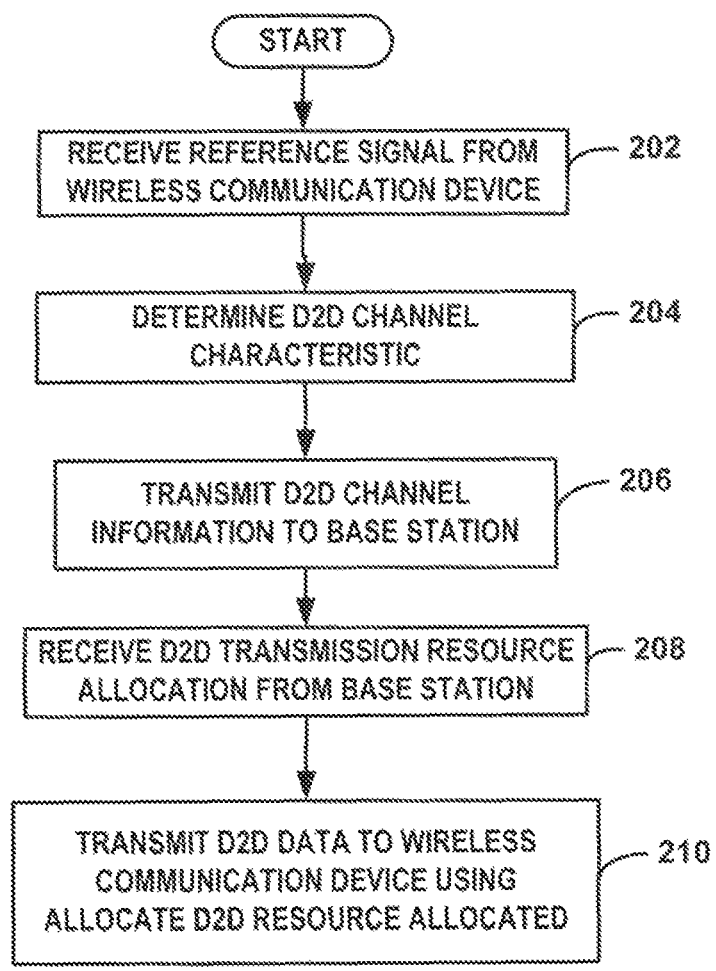
FIG. 2 is a flowchart of an example of a method of managing D2D communication at a wireless communication device.

FIG. 2 is a flowchart of an example of a method of reporting channel information performed at a wireless communication device (UE) such as the first wireless communication device 104. The method may be performed after D2D link establishment procedure has been invoked.

At step 202, the wireless communication device receives a reference signal from another wireless communication device. For the example, the second wireless communication device 106 periodically transmits reference signals. An example of a suitable technique is discussed in the above-referenced patent PCT application serial number PCT/US2012/64712. Accordingly, the first wireless communication device receives a reference signal, such as a SRS, from the second wireless communication device.

At step 204, a D2D channel characteristic is determined. The wireless communication device measures one of more channel parameters to determine at least one channel characteristic. Examples of measured parameters include SINR, SNR, Channel Gain Coefficients, Phase, and Received Power of the reference signal.

At step 206, D2D channel information is sent transmitted to the base Station. The D2D channel information may be information that is calculated based on measured channel characteristics or may be the channel characteristics. An example of D2D channel information is CSI. For the example, the D2D channel information is transmitted as part of D2D link information. In addition to CSI, the D2D link information may include a D2D Buffer Status Report (SR) indicating a volume of data to be transmitted over the D2D communication link and a D2D Power Headroom Report (PHR) indicating available transmission power for D2D transmission over the D2D communication link.

In some situations, the first wireless communication device may report D2D channel information that is derived from the measured channel characteristics. For example, the channel information may be based on a codebook. In other situations, the channel information includes the measured parameters and channel state information. In some circumstances, the first wireless communication device use the measured values to extrapolate the channel conditions to neighboring subcarriers of the reference signal and report the CSI per sub-band or for the whole channel bandwidth. In some situations where a D2D voice call is being initiated, the BSR may be omitted. The D2D link information in these situations may also include an indicator indicating that the D2D call is a voice call. Therefore, the channel characteristics for the D2D link information is typically maintained by the wireless communication device by evaluating the periodically transmitted reference signals by the second wireless communication device. The D2D link information is transmitted to the base station using macrocell uplink communication resources. For the examples, the D2D link information is transmitted with the macrocell CSI information for the macrocell communication link between the base station and the first wireless communication device 104. Transmission of the D2D link information is similar to transmission of BSR, CSI, and PHR in conventional macrocell communication. The transmission of the D2D link information, however, also includes an indication that the information is related to a D2D communication link. Accordingly, the D2D link information may be transmitted on a PUSCH or PUCCH along with macrocell link information. For the examples herein, the wireless communication device maintains a macrocell connection while engaging in D2D communication and provides channel characteristics of the macrocell channel as well D2D link information.

At step 208, the D2D transmission resource allocation is received from the base station. The identified communication resources are allocated for transmission of D2D data from the first wireless communication device to the second wireless communication device. For the example, the D2D transmission resource allocation is transmitted within D2D link establishment information transmitted from the base station. The link establishment information is transmitted over the Physical Downlink Control Channel (PDCCH) in the examples. Accordingly, the link establishment information is received by the wireless communication device using macrocell downlink communication resources in the examples, the D2D link establishment information identifies the subset of defined macrocell communication resources that are to be used for transmission of D2D signals from the first wireless communication device to the second wireless communication device. In addition, the D2D link establishment information includes Transport Format Selection and Power Control commands for D2D transmission. In some circumstances the first wireless communication device may also receive D2D link establishment information related to transmission from the second wireless communication device.

At step 210, D2D data is transmitted to the second wireless communication devices using the assigned communication resources. The first wireless communication device sends D2D data to the second wireless communication device over the D2D communication link. Using the parameters provided in the D2D link establishment information, the first wireless communication device transmits the D2D data to the second wireless communication device.

Figure 3:
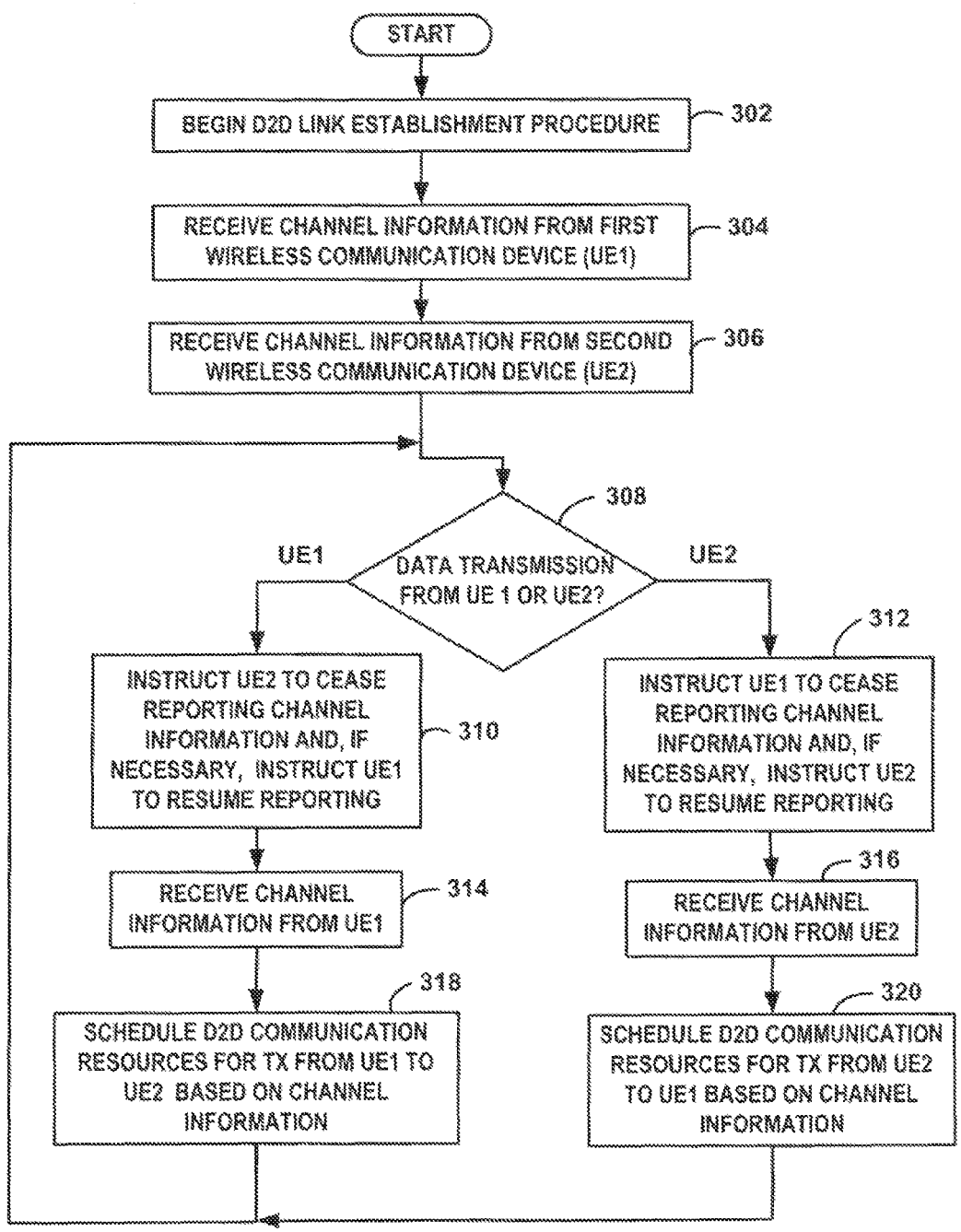
FIG. 3 is a flowchart of an example of a method of managing D2D communication performed in a core network.

FIG. 3 is a flowchart of a method of managing D2D communication performed in a base station and/or core network. The method may be performed by any combination of hardware and code within the core network. Some or all of the steps may be performed autonomously by the base station, by the controller, or another entity in the core network while some or all of the functions may be performed by collaboration by multiple entities in the network.

At step 302, the D2D link establishment procedure begins. Each of the wireless communication devices periodically transmits a reference signal. Each wireless communication device receives and processes the reference signals transmitted by the other device to detect the device. Signals are transmitted to the base station initiate a D2D link. Examples of techniques of establishing D2D communication links are discussed in the PCT Application No. PCT/US2013/040584.

At step 304, channel information is received from the first wireless communication device. As discussed above, the wireless communication device measures the reference signal transmitted by the second device and provides channel characteristics to the base station. At step 306, channel information is received from the second wireless communication device.

At step 308, it is determined whether the first wireless communication device or the second wireless communication device will transmit data over a D2D communication link. During management of the D2D link, only one of the wireless communication devices needs to provide D2D channel information. For the example, the base station selects the device that will provide D2D channel information based on the direction of data flow. If the first wireless communication device will be transmitting data, the method continues at step 310. Otherwise, the method continues at step 312.

At step 310, the second wireless communication device is instructed to cease providing D2D channel information. If the first wireless communication device is not providing D2D channel information, the first device is instructed to resume transmission of D2D channel information. The instructions are provided as part of ho D2D link management transmissions and may be transmitted within the Physical Downlink Control Channel (PDCCH) signaling or messages on PDSCH.

At step 312, the first wireless communication device is instructed to cease providing D2D channel information. If the second wireless communication device is not providing D2D channel information, the second device is instructed to resume transmission of D2D channel information.

At step 314, D2D channel information is received from the first wireless communication device, if, however, only the second wireless communication device is provided D2D channel information, the D2D channel information is received from the second wireless communication device at step 316.

At step 318, D2D communication resources for transmission of data from the first wireless communication device are scheduled at least partially based on the D2D channel information provided by the first wireless communication device. The link establishment information is sent to the first wireless communication device indicating the resources that should be used.

At step 320, D2D communication resources for transmission of data from the second wireless communication device are scheduled at least partially based on the D2D channel information provided by the second wireless communication device. The link establishment information is sent to the second wireless communication device indicating the resources that should be used for D2D transmission.

After the D2D link establishment information is sent to the appropriate device, the method returns to step 308, where it is determined which device will be transmitted D2D data. The method continues in the manner during the D2D communication session.

In addition to the transmission of messages and control signals, other information may be transmitted. For example, acknowledgments (ACKs) may be sent between the base station and devices as well as between devices. Also, some channel management steps are omitted in FIG. 3 in the interest of brevity and clarity. For example, the devices may need to establish communication with the base station using the RACH process prior to executing the method of FIG. 3

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at a communication network from a first wireless communication device, channel characteristic information determined from a signal transmitted from a second wireless communication device and received at the first wireless communication device;
   scheduling communication resources for transmission of a device-to-device (D2D) signal from the first wireless communication device to the second wireless communication device based on the channel characteristic information; and in response to determining that the first wireless communication device will transmit data to the second wireless communication device, sending an instruction to the second wireless communication device instructing the second wireless communication device to cease sending D2D channel information determined from reference signals transmitted by the first wireless communication device and received at the second wireless communication device, and sending an instruction to the first wireless communication device to resume sending D2D channel information.

2. The method of claim 1, wherein the scheduling comprises:
sending, to the first wireless communication device, D2D resource allocation information identifying the communication resources to the first wireless communication device.

3. The method of claim 2, wherein the scheduling comprises:
sending, to the first wireless communication device, D2D resource allocation information identifying the communication resources without assigning Multiple Input Multiple Output (MIMO) parameters.

4. The method of claim 2, wherein the scheduling comprises:
sending, to the first wireless communication device, D2D resource allocation information identifying the communication resources without assigning Modulation Order parameters.

5. The method of claim 2, wherein the scheduling comprises:
sending, to the first wireless communication device, D2D resource allocation information identifying the communication resources without assigning Coding Rate parameters.

6. The method of claim 2, wherein the communication resources comprise time-frequency resources.

7. The method of claim 6, wherein the communication resources comprise Multiple Input Multiple Output (MIMO) parameters.

8. The method of claim 6, wherein the communication resources comprise Modulation Order parameters.

9. The method of claim 6, wherein the communication resources comprise Coding Rate parameters.

10. A method in a first wireless communication device, the method comprising:
receiving a reference signal transmitted from a second wireless communication device;
determining, from the reference signal, a device-to-device (D2D) channel characteristic;
transmitting D2D channel information indicative of the D2D channel characteristic to a base station;
receiving, from the base station, D2D transmission resource allocation information indicating communication resources for transmitting data to the second wireless communication device over a D2D communication link;
transmitting data to the second wireless communication device using the communication resources; and
in response to determining that the first wireless communication device will transmit data to the second wireless communication device, sending an instruction to the second wireless communication device instructing the second wireless communication device to cease sending D2D channel information determined from reference signals transmitted by the first wireless communication device and received at the second wireless communication device, and sending an instruction to the first wireless communication device to resume sending D2D channel information.

11. The method of claim 10, wherein the communication resources comprise time-frequency resources.

12. The method of claim 11, wherein the communication resources comprise Multiple Input Multiple Output (MIMO) parameters.

13. The method of claim 11, wherein the communication resources comprise Modulation Order parameters.

14. The method of claim 11, wherein the communication resources comprise Coding Rate parameters.

15. The method of claim 10, wherein the receiving the D2D transmission resource allocation information indicating communication resources comprises receiving D2D transmission resource allocation information indicating time-frequency resources without identifying Multiple Input Multiple Output (MIMO) parameters, the method further comprising determining the MIMO parameters from the channel characteristic.

16. The method of claim 10, wherein the receiving the D2D transmission resource allocation information indicating communication resources comprises receiving D2D transmission resource allocation information indicating time-frequency resources without identifying Modulation Order parameters, the method further comprising determining the Modulation Order parameters from the channel characteristic.

17. The method of claim 10, wherein the receiving the D2D transmission resource allocation information indicating communication resources comprises receiving D2D transmission resource allocation information indicating time-frequency resources without identifying Coding Rate parameters, the method further comprising determining the Coding Rate parameters from the channel characteristic.

* * * * *